United States Patent [19]
Marshall et al.

[11] Patent Number: 6,011,087
[45] Date of Patent: Jan. 4, 2000

[54] MODIFIED MINERAL FILLER FOR THERMOSETS

[75] Inventors: Carl J. Marshall, Macon; Thomas J. Lynch, Branchburg; Gary M. Freeman, Macon, all of Ga.

[73] Assignee: J.M. Huber Corporation, Edison, N.J.

[21] Appl. No.: 08/995,729

[22] Filed: Dec. 22, 1997

[51] Int. Cl.⁷ ........................................................ C08K 3/00
[52] U.S. Cl. ............................ 523/205; 523/209; 523/210; 523/212; 523/213; 523/216; 524/442; 524/444; 524/445; 524/447; 524/449; 524/450; 524/451
[58] Field of Search ..................................... 523/205, 209, 523/210, 212, 213, 216; 524/442, 444, 445, 447, 449, 415, 451

[56] References Cited

U.S. PATENT DOCUMENTS

| | | |
|---|---|---|
| 4,183,843 | 1/1980 | Koenig et al. . |
| 4,473,407 | 9/1984 | Thompson et al. . |
| 5,780,531 | 7/1998 | Scholl ...................................... 523/213 |

FOREIGN PATENT DOCUMENTS

| | | |
|---|---|---|
| 0031434 A1 | 7/1981 | European Pat. Off. . |
| 3327886 | 9/1993 | Germany . |
| 54-110253 | 8/1979 | Japan . |
| 58-025333 | 2/1983 | Japan . |
| 62-086037 | 4/1987 | Japan . |
| 4-078433 | 3/1992 | Japan . |
| 49034541 | 8/1993 | Japan . |
| 1033163 | 9/1993 | Japan . |
| 2124922 | 9/1993 | Japan . |
| 8-170007 | 7/1996 | Japan . |
| 1053270 | 12/1966 | United Kingdom . |
| 2154570 | 9/1987 | United Kingdom . |
| 2278117 | 11/1994 | United Kingdom . |
| WO82/03243 | 9/1982 | WIPO . |

OTHER PUBLICATIONS

F.J. Washabaugh, "Effect of Gel Coat Extenders on the Performance of Polyester Laminates," SPI Composites Inst. 45th Annual Conf. 1990, p. 8–A, 1–5,.

J. Murphy, "Reinforced Plastics Handbook," Additive Types and Functions, Elsevier Science Publishers LTD (Oxford, UK), pp. 95–99 (May 5, 1994).

*Primary Examiner*—Edward J. Cain
*Attorney, Agent, or Firm*—Robert A. Koons, Jr.; Kenneth Crimaldi; Pepper Hamilton LLP

[57] ABSTRACT

Modified mineral fillers, derived from either a coarse particle kaolin clay or a coarse particle ATH, having excellent utility in thermoset polymers as low paste viscosity fillers are disclosed. The method of treatment involves the use of specific weight ratio combinations of a silane and a long chain aliphatic alcohol. The treatment of clay can also involve the auxiliary use of a surfactant in small amounts, which is utilized to emulsify the silane and aliphatic alcohol treatment components in water either individually or as a co-emulsion blend prior to their addition to the clay. The surfactant, which is preferably a nonionic surfactant having a HLB value of 12–18, aides in uniformly treating all the clay particle surfaces with the silane/alcohol treatment combination. Coarse particle clays having general utility in the invention are those having an average Stokes equivalent particle diameter of at least 3.0 microns, while the coarse particle ATH fillers having general utility in the invention are those having a BET surface area value less than 5.0 m²/g. Clays or ATH so treated with the inventive silane/alcohol treatment provide unique viscosity reduction benefits in thermoset polymers unattainable by using either treatment additive alone in any amount. This low viscosity characteristic allows the treated mineral products to be used at high loadings in various thermoset compounds, as fillers or extenders, which is advantageous in terms of reducing cost and/or gaining certain performance properties, such as physical reinforcement, composite surface smoothness or flame retardancy.

58 Claims, 5 Drawing Sheets

BF viscosity response surface (cps/$10^3$) for treated clays at 89 phr

BF viscosity response surface (cps/10³) for treated clays at 82 phr in

Clay A vs. Clay C at Various Loadings

MODIFIED MINERAL FILLER FOR THERMOSETS

FIELD OF THE INVENTION

The present invention relates to a modified mineral filler, its composition and properties, methods for its production, and its end-use applications. More particularly, the invention relates to the manufacture of a treated kaolin clay produced from a coarse particle size, waterwashed clay treated with a mixture of a silane and a long chain aliphatic alcohol; the clay so treated being particularly well suited for use in thermoset polymers as a filler or extender. Treatments comprising said mixture of a silane and a long chain aliphatic alcohol are also useful in modifying the performance properties of other mineral fillers, such as alumina trihydrate, commonly used in thermoset polymers.

BACKGROUND OF THE INVENTION

Kaolin clay (kaolinite) is a naturally occurring, crystalline aluminosilicate material having the chemical formula $Al_2Si_2O_5(OH)_4$ and structurally consisting of linked, alternating layers of tetrahedral silicon and octahedral aluminum. Mined crude kaolin clay is typically refined for use as fillers in rubber, plastics, and other polymers, as well as for use as pigments or pigment extenders in paints and other industrial coatings. Kaolin clay crudes are generally processed in one of two ways: 1) via an airfloat process wherein the crude clay is crushed, dried, pulverized, and then air-classified to the desired particle size and to remove unwanted impurities; or 2) via a waterwashed process wherein the crude clay is dispersed in water, degritted, fractionated and then subjected to various chemical beneficiation steps to improve its brightness properties. The subsequent chemical treatment of such clays has typically been accomplished via the addition of the treatment additives, in neat or emulsified form, to an aqueous slurry of the dispersed clay or to the clay in dry powder form with good mixing where after the treated clay is dried as needed to yield a dry product of moisture content less than 1%. Alumina trihydrate (commonly referred to as ATH or gibbsite) has the chemical formula $Al(OH)_3$ and is typically refined for use as fillers or as flame retardants in plastics and other polymers. ATH fillers having specific particle size properties can be produced via direct precipitation methods or coarse particle precipitates of ATH can be mechanically ground by either wet or dry grinding methods to yield the desired products of finer particle size. The chemical treatment of ATH products has typically been accomplished via the addition of the neat treatment additives to the ATH in dry powder form with good blending in a solids/liquid blending device with the optional use of heat.

Although mineral additives like kaolin clay, treated kaolin clay, ATH or treated ATH have historically been viewed as merely low cost fillers, they are often a critical factor in the processing of polymeric composites. These processing aspects are particularly important in thermoset compounds, such as those prepared from epoxies or unsaturated polyesters, since mineral filler loadings are typically high (e.g., on the order of 80–120 phr or higher). Minor variations in filler properties are well known to cause significant variations in the paste viscosity profile of thermoset compounds. Hence, the physical properties of the fillers must be maintained within certain tightly controlled limits to produce thermoset composites of very consistent quality. Furthermore, having a lower viscosity filler can be important in thermoset applications in terms of improving the processability of the filled compound and/or for greater ease of dispersion of the filler. It should be noted that achieving improved filler dispersion very often results in improved physical properties for the finished plastic. In addition, lower compound viscosities permit increased loadings of mineral fillers (to decrease compound cost and/or increase certain physicals as desired) without loss of processability.

One way in which the wet-out, dispersion and resultant viscosity properties of a given mineral filler can be improved is through chemical treatment with additive(s) that make the filler's surface more organophilic and thereby more compatible with the polymer matrix. Various treatments of mineral fillers, such as the treatment of kaolin clays, for subsequent use in polymers are known in the prior art as will be later discussed. However, the specific organic functionality, polarity, hydrophobicity and cost associated with such chemical treatments can have a tremendous influence on the resultant performance and cost versus performance characteristics of the treated mineral product. This behavior is a function of the surface chemistry of the mineral filler, the chemistry of the polymer matrix and the end-use performance benefit desired. Some treatments for clay or ATH fillers with various silanes or blends of silanes are known. However, we have found that the use of silane treatments alone on clay often do not yield the amount of viscosity reduction in thermosets desired and are generally too expensive relative to the viscosity reduction benefits obtained. In addition, the silane treatment of clays or ATH can often cause other problems in terms of producing treated products so hydrophobic in nature that airborne dust hazards are created during their handling. Consequently there has been a long-felt need for a cost effective, but low dusting treatment for mineral fillers, such as for kaolin clay or ATH, that significantly reduces the paste viscosity of thermoset compounds containing the mineral fillers.

SUMMARY OF THE INVENTION

The need for a more effective treatment for mineral fillers is met by the present invention. What has been discovered and is disclosed here is a method of modifying coarse particle size clays with a combination of a silane and an aliphatic alcohol, where synergistic effects result on the viscosity performance of the kaolin clays so modified, when the resulting modified clays are used as fillers with thermoset resins. Furthermore, it has been discovered that the modification of other mineral fillers, such as ATH, with these silane/alcohol combinations also provide many performance benefits. A novelty of the invention lies in the combination of both a silane and an aliphatic alcohol in the treatment composition, rather than the use of either treatment agent alone, which differs from conventional practice in the art. The silane and aliphatic alcohol components can be added individually or as a pre-blend of additives to the mineral filler. The silane and aliphatic alcohol components or pre-blend can be used neat or added as an aqueous emulsion; however, the latter treatment method employing a silane/alcohol emulsion is generally preferred in terms of yielding good treatment uniformity on clays. In the treatment of ATH fillers, the treatment additives are more typically applied as a neat blend of silane and aliphatic alcohol.

By the teaching of the present invention a coarse particle size kaolin clay is contacted with both an emulsified silane, and with an emulsified aliphatic alcohol. The silane and aliphatic alcohol may be emulsified separately, or may be present in the same emulsion to carry out the invention. The kaolin clay being modified may be dry before contacting it with the emulsified treatment agents or may be in an aqueous slurry. When a dry clay is to be modified, it is preferably utilized in a finely divided form as opposed to a spray-dried bead bead form. The clay being treated is then blended or mixed well with the treatment additives to ensure uniformity, dried to remove excess moisture, and milled until any agglomerates are broken. Clays or other mineral fillers treated by the method of the present invention are novel as they have properties heretofore not observed in any clays or ATH fillers known to the art. The treated clays of this invention are especially useful as fillers for thermoset resins, and coarse particle clays treated according to the method of the invention give rise to filled resin compositions with unusually low Brookfield viscosity, good processability and reduced sensitivity to moisture effects. The treated mineral products of this invention, in a finely divided dry form, also have desirable properties in that they generate significantly less airborne dust during various dry handling processes as compared to their silane treated counterparts.

OBJECTS OF THE INVENTION

It is an object of the invention to have a chemical surface treatment for mineral fillers, such as for kaolin clays or ATH, that will lower the paste viscosity of the mineral filled thermoset compound used for molding. Furthermore, this reduction in paste viscosity will often enable high mineral filler loadings of 100 phr or greater to be employed without detriment to compound processability.

It is another object to have a chemical surface treatment for mineral fillers, such as for kaolin clays or ATH, which will improve the wet-out and dispersibility properties of the treated clay or treated ATH used in mineral filled thermoset compounds.

It is a farther object of the invention to have a hydrophobic chemical surface treatment for mineral fillers, such as for kaolin clays or ATH which will exhibit reduced dusting problems when such treated mineral fillers are subjected to dry handling processes.

It is a further object of the invention to have a hydrophobic chemical treatment for mineral fillers, such as for kaolin clays or ATH, which will exhibit reduced dusting problems when such treated mineral fillers are subjected to dry handling processes.

Another object is to have a chemical treatment for mineral fillers, such as for kaolin clays or ATH, which will minimize the moisture sensitivity of the mineral filler with respect to viscosity changes in thermoset polymer applications.

Another object is to have a chemical treatment for mineral fillers, such as for kaolin clays or ATH, which provide viscosity reduction benefits in mineral filled thermosets that are more cost effective than using silane treatments alone on said minerals.

Yet another object of the invention is to have a single modified product for clay and for ATH, respectively, which will have good utility as a low viscosity filler in both epoxy and polyester thermoset systems as opposed to the need for different treatments for different polymers.

DETAILED DESCRIPTION OF THE INVENTION

Figure 1:
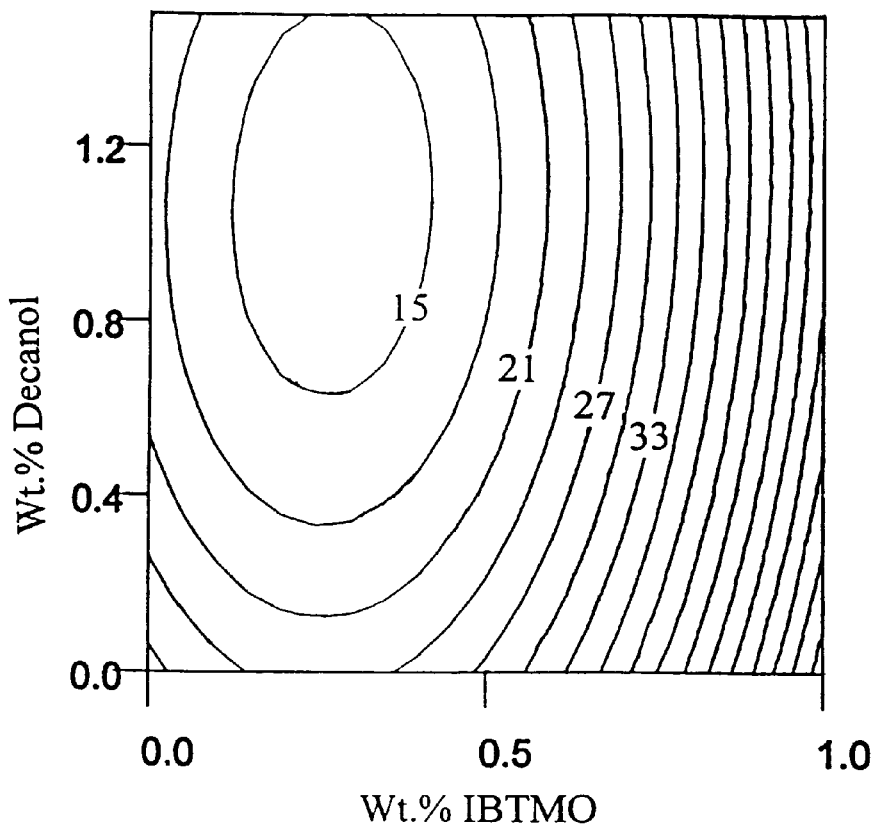
FIG. 1 is the Brookfield viscosity response surface for a clay filled polyester resin (Ashland Chemical's Aropol MR13017) as a function of silane (isobutyltrimethoxysilane) and aliphatic alcohol (n-decanol) treatment levels applied to Clay A (a coarse particle kaolin clay). The treated clay loading was 89 phr and all test clays had a free moisture content of about 1% by wt. when evaluated. The response surface shows that the lowest paste viscosity can be obtained only by using a combination of both treatments.

The need for low cost, low viscosity mineral fillers has been addressed in the present invention by modifying a mineral filler, such as a coarse particle size kaolin clay or a coarse particle ATH, with a dual-component treatment mixture consisting of a silane and a long chain aliphatic alcohol. Various combinations of silane and long chain aliphatic alcohol have been found to yield a synergistic viscosity reduction benefit in thermosets not achievable with either treatment component alone at any treatment level. Furthermore, the use of a long chain aliphatic alcohol in place of an expensive silane reduces the total treatment cost thereby improving the cost/performance characteristics of the treated product. The ability of long chain aliphatic alcohols (which are a non-bonding, coating additive towards clay or ATH) to replace significant amounts of silane (which are capable of covalently bonding to clays or ATH) while actually improving overall viscosity reduction is surprising and unexpected. The aliphatic alcohols also surprisingly reduce the dustiness of the final treated product to a significant degree relative to using a silane treatment alone.

Another unexpected performance benefit provided by the silane/alcohol treatment technology of this invention is in reducing the large viscosity effects seen when mineral fillers of different free moisture content are incorporated into a thermoset system. Kaolin clays, being an aluminosilicate composition, have a large number of surface hydroxyl groups and thus present a hydrophilic surface that is highly susceptible to free moisture pickup depending on the surrounding atmospheric conditions. Free moisture is that amount of surface adsorbed water that can be easily removed via heating the clay in an oven for 2 hours at 105° C. Commercially, kaolin clays are normally produced at free moisture contents of 0.5%–0.8% by weight; however, given sufficient time and exposure to high humidity they can equilibrate to even higher levels of free moisture content of 1.0% by weight or higher. Test work in different thermoset polymers has shown that significant increases in paste viscosity are obtained as the free moisture level on a given clay filler increases from 0.2% to 1.2%. Over this free moisture range, paste viscosities have often been observed to double when clay filler loadings are high. It is therefore a significant performance advantage that the coarse particle size, modified kaolin clays of this invention show a significantly reduced sensitivity to moisture with respect to their resultant paste viscosities in thermosets. ATH is also a hydroxylated mineral filler that is susceptible to free moisture pickup, although to a lesser degree than clays because of the lower BET surface area of ATH. Free moisture levels on a coarse particle ATH, as produced, are generally less than 0.5% by weight. The modification of ATH again helps to mitigate the effects of free moisture on viscosity but the magnitude of the viscosity benefit is generally smaller than what is seen for clays.

For reducing a mineral filler's viscosity in thermoset systems, the preferred treatment combinations of silane and long chain aliphatic alcohol applied to clay or to ATH comprise the use of dialkoxy or trialkoxy organosilanes defined by the structural formula I shown below:

$$R\text{—}Si(R')_x(OR')_{3-x} \quad (1)$$

where

R=$C_1$–$C_{10}$ Alkyl, alicyclic alkyl-, aryl-, vinyl, or methacryl-,

R'=methyl or ethyl, and x=an integer value of 1 or 0, in combination with long chain aliphatic alcohols of $C_6$–$C_{18}$ carbon chain length or with various blends of these aliphatic alcohols. The $C_1$–$C_{10}$ alkyl group comprising the silane constituent R can be either linear or branched. Particularly preferred organosilanes in the present invention are isobutyltrimethoxysilane (IBTMO), vinyltriethoxysilane (VTEO), n-octyltriethoxysilane (OCTEO), methyltrimethoxysilane (MTMS) and n-propyltrimethoxysilane (PTMO), while particularly preferred long chain aliphatic alcohols to be used in combination with the above organosilanes are n-octanol, n-decanol and blends of n-decanol/dodecanol. The silane designations IBTMO, VTEO, OCTEO, MTMS and PTMO are product trademark designations of Huls America Inc. Effective treatment levels on clay or on ATH for these combinations of silane and long chain aliphatic alcohol range from 0.01–1.0% by weight of silane and from 0.01–3.0% by weight of aliphatic alcohol wherein the relative weight ratio of silane to aliphatic alcohol preferably ranges from 5:1 of silane/alcohol to 1:15 of silane/alcohol. The above weight percentages of treatment are based on the active amount of treatment chemical applied to the mineral filler on a dry basis. More preferably, the treatment combinations of silane and long chain aliphatic alcohol are employed at respective treatment levels ranging from 0.1–0.5% by weight of silane and from 0.1–1.6% by weight of aliphatic alcohol wherein the relative weight ratio of silane to aliphatic alcohol preferably ranges from 2:1 of silane/alcohol to 1:7 of silane/alcohol. It should also be mentioned here that the pre-treatment of a coarse particle clay or coarse particle ATH with these silane/alcohol combinations is preferred since the pre-treated product is much more effective in reducing paste viscosity than adding "in situ" the same relative amounts of each chemical to the mineral filled thermoset compound.

The treatment of the present invention may be used with any coarse particle kaolin clay. In fact, the inventive silane/alcohol treatment is very effective in reducing the viscosity of any clay employed as a filler in a thermoset polymer. However, coarse particle clays are preferred for use in this invention since they have inherently low viscosity characteristics in thermosets as a consequence of their low BET surface area values. Such coarse particle clays can be generally defined as having an average Stokes equivalent particle diameter of at least 3 microns, with Huber 35 clay (produced by J. M. Huber Corporation of Macon, Ga.) and ASP-400 clay (produced by Engelhard Corporation) being representative examples. These two competitive coarse particle clays are both waterwashed clays that typically have an average Stokes equivalent particle diameter of about 4.0 microns, as measured via an x-ray Sedigraph. A highly preferred filler for use in polyester resins or in epoxy resins is the treated clay product (Clay C) produced by treating Clay A with a silane/alcohol combination consisting of 0.25% by weight of IBTMO and 0.50% by weight of n-decanol. Clay A is defined here as a coarse particle kaolin clay having an average Stokes equivalent particle diameter of about 4.5 to 6.0 microns and a BET surface area of about 8 to 11 m²/g, wherein the particular lot of Clay A used in the following illustrative examples had an average Stokes equivalent particle diameter of 5.25 microns and a BET surface area of 9.7 m²/g. In the case of treating ATH, the treatment may be used with any coarse particle ATH. Such coarse particle ATH fillers can be generally defined as having a BET surface area less than about 5.0 m²/g, with SB-432 (produced by J. M. Huber Corporation of Fairmount, Ga.) being a representative example. SB-432 is a dry ground ATH that typically has an average Stokes equivalent particle diameter of about 9.0 microns and a BET surface area of about 2.0 m²/g.

Treatment of the particulate minerals with the silane/alcohol combinations can be accomplished in a variety of ways, and can result in modified particulate mineral products that are considered in the art to be treated, surface treated, coated, encapsulated, intercalated and/or cation exchanged. The most preferred method of treatment involves emulsification of the treatment additives in water using small amounts of a surfactant where the emulsified additives are then added to dry clay in a solids/liquid blending device that provides good mixing action. By "blending" in this disclosure is meant any sort of mixing by mechanical action which will agitate or mix a clay or other mineral with a silane/alcohol combination to a uniform, well mixed state. Suitable solids/liquid blenders include such devices as a Henschel blender, ribbon blenders, pin mixers, Bepex Turbulizers and the like. The dry clay is preferably treated with these emulsified additives in a finely divided, pulverized powder form so that good treatment uniformity on all the clay particle surfaces can be achieved. After blending the clay and emulsified additives for approximately 5–15 minutes, the treated clay is then dried to a product with a free moisture content of about 0.3% by weight, then post milled to eliminate treated clay agglomerates so as to yield the treated product in a dry, finely divided form. Blending is carried out for a period of time sufficient to achieve the characteristics desired in the mineral being treated, being readily determined by one skilled in the art of preparing and evaluating minerals for use as fillers in thermoset resins. The drying step can be readily accomplished with the use of conventional drying devices such as a flash drier, rotary drier, or the like. Deagglomeration via post-milling can be achieved using a hammer mill, pin impact mill, imp mill or other similar milling device.

Emulsification of the silane and the long chain aliphatic alcohol for treatment use can be carried out individually or as a blend. When emulsified individually, the silane emulsion and the aliphatic alcohol emulsion are both preferably prepared at active concentrations of 25–50% by weight in water using a very small amount of a surfactant (about 4% by weight of the treatment additive). Similarly, co-emulsified blends of silane and aliphatic alcohol in water can be prepared in an analogous manner wherein the combined concentration of actives is again 25–50% by weight. The above silane/alcohol emulsions are preferably prepared at a pH of 8–10 for stability purposes and the preferred surfactants employed for emulsification are nonionic surfactants having a HLB value of 12–18. A particularly preferred nonionic surfactant is TWEEN® 20 of ICI Surfactants, a polyoxyethylene (20) sorbitan monolaurate having a HLB value of 16.7. Treatment studies on coarse particle clay with the above aqueous emulsions have shown that equivalent viscosity reduction performance is achieved independent of whether separate additive emulsions (either order of addition) or an emulsion blend are applied to the dry clay. Over the silane/alcohol additive levels of utility in the inventive treatment, the resulting levels of surfactant residue left in the finished treated product can range between 8–1600 ppm. These nonionic surfactant amounts are small enough not to directly influence the quality or performance of the mineral filled thermoset compounds, but they instead act as a processing aide in uniformly applying the silane/alcohol treatment. The ability to uniformly coat all the mineral filler particles with the silane/alcohol treatment can be important to achieving the maximum viscosity benefit in thermoset polymers.

Other methods of clay treatment with silane and aliphatic alcohol are also possible. For example, treatment of dry clay with the neat treatment additives can be practiced so long as sufficient blending time is allowed to enable uniform coating of the clay particles. Preferably, the neat silane/alcohol additives are added in pre-blended form to dry clay that has been pre-heated to facilitate good mixing action in the solids/liquid blender. Ideally, sufficient contact time is desired for the silane to hydrolyze and completely react with the surface hydroxyls present on the clay filler particles. Given the lower levels of water available for silane hydrolysis and the particularly slow rates of hydrolysis associated with the use of alkyltrialkoxysilanes, such as IBTMO, longer blending times can be required to allow sufficient reaction time and avoid treatment chemical losses as compared to the treatment method using emulsified silane/alcohol additives. In addition, clay slurry treatment with the emulsified silane/alcohol treatment additives followed by conventional spray-drying and post-milling can be practiced, but this method is generally less preferred given the likelihood of some treatment chemical losses via volatilization of the additives. In treating kaolin clay slurries, the use of dispersed filter cake clay slurries of 50%–60% solids are a particularly convenient form for treatment given their availability from the clay waterwash process.

Treatment of ATH fillers with the silane/alcohol combinations of this invention can also be accomplished in a variety of ways. The most preferred method of treatment involves the addition of the silane/alcohol additives in a neat pre-blended form to dry ATH in a solids/liquid blending device that provides good mixing action. Preferably the dry ATH is pre-heated to facilitate good mixing action in the solids/liquid blender. By dry blending here is meant any sort of mixing by mechanical action which will agitate or mix the ATH with the neat silane/alcohol combination to a uniform, well mixed state. As in the case of clay treatment, suitable solids/liquid blenders include such devices as a Henschel blender, ribbon blenders, pin mixers, Bepex Turbulizers and the like. After blending the ATH and neat additives well to ensure good treatment uniformity on all the particle surfaces, the treated ATH is then post-milled to eliminate any agglomerates so as to yield the treated product in a finely divided form. Deagglomeration via post-milling can be achieved using a hammer mill, pin impact mill, imp mill or other similar milling device.

Given their very low viscosity properties in resins/polymers, a prime commercial application for the modified particulate mineral products of the present invention is as a general purpose filler for thermoset compounds, such as those produced from unsaturated polyester resins, epoxy resins or acrylic resins. The content of the modified mineral fillers of this invention in various thermoset polymers can range over mineral filler loadings of about 10–220 phr (parts per hundred resin), and more preferably range from about 50–175 phr depending on the specific end-use application. It should be noted however that the modified ATH fillers can in general be used at higher loadings within the above stated ranges as compared to the modified clay fillers. This difference is principally due to the significantly lower BET surface area of coarse particle ATH's versus coarse particle clays. A large market opportunity exists for very low viscosity mineral fillers in glass reinforced polyester molding compounds, for automotive parts and other general hardware, which is made in heated matched metal dies or molds. Significant performance advantages are often realized if the mineral filler has good chemical inertness and a high particle aspect ratio, as is the case with the kaolin clays used in this invention, in addition to providing very low viscosity properties. High filler particle aspect ratio can translate to increased physical properties thereby allowing in some cases the partial replacement of glass reinforcement with a less expensive, modified clay filler. The advantages of using coarse particle clay instead of $CaCO_3$ are discussed in greater detail below. In the case of modified ATH fillers of coarse particle size, they also exhibit very low viscosity properties and provide the additional benefit of functioning as a flame retardant additive. Beyond treating coarse particle clays and ATH, the inventive silane/alcohol treatment should be easily recognized by one skilled in the art as having utility on other silicate based particulate minerals, such as calcined clays, talc, mica, silicas, wollastonite, etc. for the purposes of lowering their paste viscosity in thermoset polymers.

Polyester molding compound is conventionally produced in the form of sheet molding compound (SMC) or bulk molding compound (BMC). SMC and BMC compounds are formulated from polyester resins, reinforcements (typically glass) and mineral filler additives (like clays, calcium carbonate or ATH) and are match metal die molded under high heat and pressure to form the plastic parts. Sheet molding compound is made by dropping glass fibers onto the surface of a polyethylene film which has first been coated with a non-polymerized polyester resin paste. Two sections of coated film are then squeezed together (coating to coating) that forms a sandwich like composite upon curing. Bulk molding compounds are similar in chemical composition to SMC compounds but the manufacturing process differs. In BMC, low intensity mixers are typically used to gently wet-out the glass fibers and mineral fillers into the resin paste for subsequent molding. A more detailed explanation of these two polyester molding processes can be found in the following reference books:

1) "Sheet Molding Compounds, Science and Technology"; edited by Hamid G. Kia, Hanser/Gardner Publications, Inc., Cincinnati, Ohio, 1993.
2) "Reinforced Plastics Handbook"; by John Murphy, Elsevier Science Publishers LTD, Oxford, U.K., 1994, pp. 26–37.

Beyond traditional SMC and BMC, sub-market applications for the low viscosity treated mineral fillers of this invention include various specialty SMC/BMC molding compounds, pultrusion (specialty pultruded products), CIPP (cured-in-place pipe), and solid surface cast polymers. Good examples of where the inventive treated clays can be used in specialty SMC/BMC compounds to good advantage include sewage treatment weirs and baffles and deck gratings used in corrosive environments. In regards to producing low density molding compounds, it is advantageous to replace $CaCO_3$ with lower density fillers (like clays) to achieve low weight per volume and a Class I surface in exterior automotive body panels. In many cases, these low density compounds are molded under low pressure. Pultrusion is a molding technique that involves pulling fiberglass reinforcement through polyester resin baths filled with a coarse clay (and other ingredients) and then through heating it dries to form profiles. This is an application where the treated, coarse particle clays of this invention provide a significant processing advantage given their very low viscosity properties. CIPP is a relatively new thermoset application emerging for clays wherein existing potable water and natural gas pipes are rehabilitated without digging by inverting an epoxy resin saturated, clay filled liner into the old pipe and then curing it with hot water or by other mechanisms. In CIPP, the low viscosity properties provided by the treated, coarse particle clays of this invention are again very advantageous. In regards to producing cast polymer composites from acrylics or from polyester resins with Class I flame retardancy properties, such as desired in the manufacture of solid surface countertops for household applications, it is very advantageous to use the treated, coarse particle ATH fillers of this invention since their low viscosity properties allow high loadings of ATH to be employed.

There are important reasons why one would use a low viscosity, coarse particle size treated clay as the principal or sole mineral additive of choice in many of the above mentioned thermoset applications, including: (1) pH stability or good resistance to corrosion, (2) lower specific gravity than calcium carbonate (2.6 g/ml versus 2.71 g/ml, respectively), (3) molded part surface profile (i.e., surface smoothness) as a result of their particle aspect ratio, and (4) notable cost/performance advantages, with the exception of flame retardancy, versus ATH (alumina trihydrate). Surface finish is particularly important for thermoset composites (such as in SMC) used in automotive body panels and fascia or other aesthetically-demanding applications. Use of the inventive silane/alcohol treatment on a coarse particle clay thereby helps to address the one performance shortcoming that clays have typically had relative to $CaCO_3$ and that is in paste viscosity. Although still not equivalent in paste viscosity to a coarse particle, dry ground $CaCO_3$ (such as J. M. Huber's Q6, G8 or W4 products), the inventive treatment when applied to a coarse particle size clay helps to significantly reduce the difference in viscosity between clays and ground calcium carbonates. A modified coarse particle kaolin clay that simultaneously offers very low viscosity build, good physical reinforcement and excellent surface finish properties as an inexpensive filler for thermoset composites helps to satisfy several industry needs. This unique combination of performance properties for thermoset composites is unknown in the prior art and truly remarkable. In thermoset applications needing good flame retardancy properties, such as in various cast polymer/solid surface products, the use of low viscosity, modified ATH fillers in accordance with the invention are then particularly advantageous relative to the use of coarse clays or calcium carbonates. Clays and calcium carbonates are non-combustible fillers, but ATH has the ability to function as a flame retardant additive for polymers by endothermically releasing water via its dehydroxylation at temperatures of about 200° C.

As discussed in the "Reinforced Plastics Handbook," pages 95–99, the use of mineral fillers such as clays to alter various thermoset composite properties and to reduce cost is well known to those skilled in the art. In addition, many examples of silane treated clays, or silane treated ATH that are employed as fillers in thermoset resins are described in the prior art. For example: 1) F. J. Washabaugh; "Effect of Gel Coat Extenders on the Performance of Polyester Laminates", SPI Composites Inst. 45th Annual Conf. 1990, paper 8-A, pp. 5; and 2) patent JP 02124922, "Moulding Epoxy Resin Composition for Electronic Parts". However, this prior art does not teach the use of silane treatment for lowering paste viscosity, but rather for yielding improved wet-out and dispersibility, improved water resistance, and other physical properties. Furthermore, this prior art does not teach the use of long chain aliphatic alcohols in combination with any silane as co-additive treatments on a clay or on ATH for the purposes of lowering cost, lowering the dustiness of the treated product, lowering moisture sensitivity as related to viscosity changes or for lowering filled compound viscosity. Our test work has shown that silane treatments alone on mineral fillers will yield some viscosity reduction benefits; however, the magnitude of the benefit obtained relative to the additional cost is often not commercially attractive.

Other prior art exists that describes mineral surface treatments that lower thermoset paste viscosities, however the reagents described are unlike the silane/alcohol treatment system disclosed in this invention. This prior art includes surface treatment with aliphatic carboxylic acids as described in patent GB 2154570, or using both a polymer and a carboxylic acid as in GB 2278117. Patent JP 01033163 describes the coating of the kaolinite particle's surface with a polyester prior to adding it to the bulk polyester resin to lower paste viscosity. Polymeric quaternary ammonium salts attached to smectite clays (U.S. Pat. No. 4,473,407) and phosphate esters coated on various mineral fillers including ATH, $CaCO_3$ and clay (U.S. Pat. No. 4,183,843) are also reported to be useful surface treatments for reducing resin paste viscosities. Alcohols were used as coatings on $CaCO_3$ fillers to lower viscosities in resins as reported in patents DE 3327886 and JP 52003975, though this art does not teach using aliphatic alcohols in combination with silanes as co-additive treatments to achieve a synergistic viscosity lowering effect. Furthermore, the prior art does not teach the use of the inventive silane/alcohol treatment on a coarse particle size, kaolin clay or on a coarse particle ATH.

Since formulators of thermoset compounds are often trying to use the highest mineral filler loading possible to extend resin and reduce costs, then the paste viscosity performance of the inventive treated clays and the inventive treated ATH fillers are both very well suited to accomplishing this goal. Useful filler loadings for the treated mineral fillers of this invention in various thermoset polymers can range from about 10–220 phr by weight, and more preferably range from about 50–175 phr by weight depending on the specific end-use application. Given their total performance features, it is also well recognized to one skilled in the art that the modified coarse particle size mineral fillers in accordance with the invention could be used in combination with one another (e.g., blends of treated clay and treated ATH) or in combination with other unmodified inorganic fillers (such as ATH, $CaCO_3$, talc, mica, glass, silicas, wollastonite, calcined clay, delaminated kaolin clay, and combinations thereof) to produce a thermoset composite having a unique set of end-use properties. When using the modified mineral fillers of this invention in combination with at least one unmodified inorganic filler, the total amount of filler (treated plus non-treated) in the thermoset composition can range from about 10 to about 220 phr by weight. The viscosity performance advantages provided by the modified coarse particle size mineral fillers of the present invention have been demonstrated in a wide variety of thermoset compounds, including those produced from epoxy, unsaturated polyester, and acrylic resin systems. These performance advantages are clearly shown in the following examples. The examples also further illustrate the present invention in terms of demonstrating some of its preferred embodiments and are not limiting thereof.

EXAMPLE 1

Figure 2:
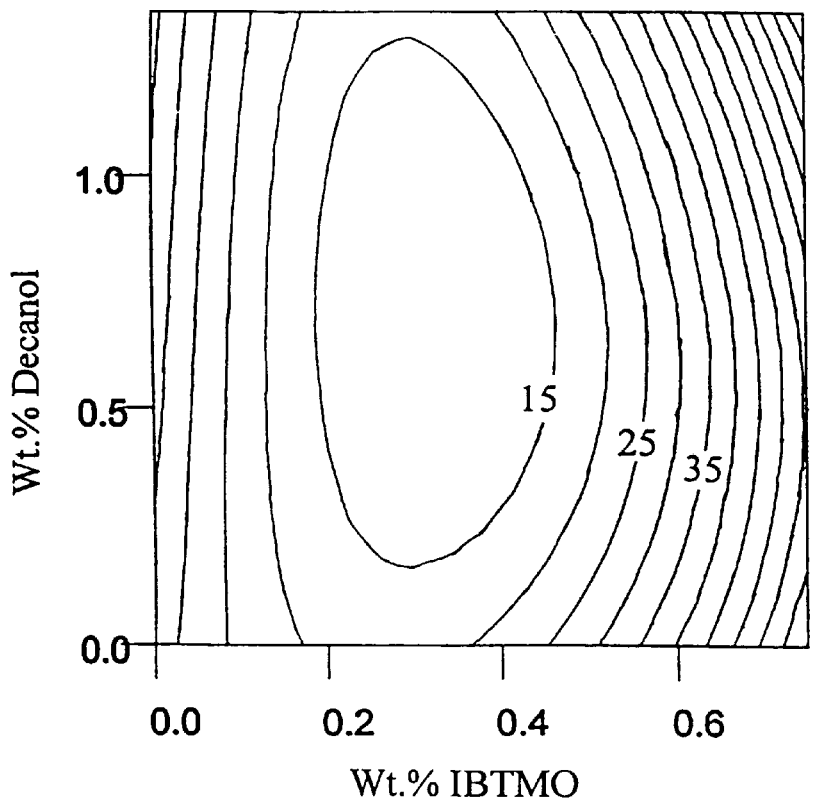
FIG. 2 is the Brookfield viscosity response surface for a clay filled epoxy resin (Shell Chemical's Epon 862) as a function of silane (isobutyltrimethoxysilane) and aliphatic alcohol (n-decanol) treatment levels applied to Clay A (a coarse particle kaolin clay). The treated clay loading was 82 phr and all test clays had a free moisture content of about 1% by wt. when evaluated. The response surface shows that the lowest paste viscosity can be obtained only by using a combination of both treatments.

A modified coarse particle size kaolin clay which exhibits very low viscosity properties in thermoset resins, was prepared as follows: An aqueous co-emulsion of n-decanol and isobutyltrimethoxysilane (IBTMO) was prepared by combining water (202 g), silane (70 g), alcohol (140 g), polyoxyethylene (20) sorbitan monolaurate (8.4 g), and sodium hydroxide (42 mg) into a Waring blender and mixing this combination at high speed for 5 minutes. This mixing procedure yielded a silane/alcohol emulsion of 1:2 weight ratio having a combined actives content of 50% by weight. The actives content of this emulsion was defined as the sum of its silane and alcohol components by weight %. A beneficiated, coarse particle kaolin clay having an average Stokes equivalent particle diameter of 5.25 microns and a BET surface area of 9.7 $m^2/g$ was utilized as the clay feed for treatment in a dry, finely milled form. This coarse particle clay is hereinafter referred to as Clay A. Treatment of Clay A with the aqueous silane/alcohol emulsion was carried out in a high intensity laboratory solids/liquid blender, such as a Henschel FM-10 blender, by blending the dry clay (2.0 kg) at about 1200 rpm while slowly adding the silane/alcohol emulsion to it. Blending of Clay A with the emulsified additives was continued for an additional 5 minutes, whereafter the treated clay was oven dried for 2 hours at 60° C., then cooled to room temperature and hammer milled into a finely divided powder. Prior to their viscosity evaluations, the treated clays were allowed to equilibrate to a specified free moisture content in a humidity chamber. It should be noted that the amount of silane/alcohol emulsion to be delivered to the Henschel blender for treatment is contingent on the clay treatment levels desired. Using the above method, treatment levels as high as 1.0% IBTMO plus 2.0% n-decanol can be readily produced. In addition, other weight ratios of silane to aliphatic alcohol can be used for the treatment of Clay A; however, the treated clay product having a treatment consisting of 0.25% by weight of IBTMO plus 0.5% by weight of n-decanol on Clay A (hereinafter called Clay C) is particularly advantageous for use as a filler in both polyester and epoxy based thermosets as evidenced by the viscosity profiles shown in FIGS. 1 and 2. FIGS. 1 and 2 are discussed below in Examples 2 and 3, respectively.

The physical data reported above and in all subsequent examples were determined as follows. The free moisture content of a clay in wt. % was determined by drying test samples in a forced air oven at 105 deg. C. for approximately 2 hours in accordance with the TAPPI Method T671 cm-85 procedure. All Sedigraph particle size measurements, whether reporting the wt. % of particles <2 microns or reporting the average Stokes equivalent particle diameter in microns, were made via an x-ray sedimentation method based on Stokes Law using a Micromeritics 5100 Sedigraph unit. The Malvern median particle size values, reported in microns, were measured with Malvern's Mastersizer/E unit which is based on a laser light scattering/Fraunhofer diffraction method as generally described in U.S. Pat. No. 5,167,707 and references cited therein. BET Surface Areas were determined by the nitrogen absorption method described by Brunauer, Emett, and Teller in the "Journal of the American Chemical Society," Volume 60, page 309, published in 1938. A multi-point surface area determination was made on the clay test samples after outgassing them at 130 deg. C. using a Micromeritics Gemini III 2375 unit. All Brookfield (denoted BF) viscosity measurements, unless otherwise stated, were made at 32° C. with a Brookfield HBT viscometer using spindle #4 at 20 rpm.

EXAMPLE 2

In this example, the lower paste viscosity benefits provided by the treated clays of the present invention versus an untreated clay control were clearly demonstrated in a polyester thermoset application in accordance with FIG. 1. Clay A, in dry form, was treated with a series of aqueous silane/alcohol emulsions consisting of IBTMO and n-decanol across a range of treatment levels having different weight ratios of each reagent in a manner analogous to that described in Example 1. After preparation, this set of treated clays was allowed to equilibrate to a free moisture content of about 1% by wt. in a humidity chamber whereafter they were then high speed dispersed over a mixing period of 5 minutes into a general purpose polyester resin, Aropol MR13017 from Ashland Chemical, using a Cowles dissolver unit at a filler loading of 89 phr (pounds per hundred resin). The filled polyester resins were sealed and placed in a 32.0° C. constant temperature bath for 1 hour. The viscosities were then measured on a Brookfield HBT viscometer using spindle #4 at 20 rpm. A viscosity response surface of these data showing silane treatment level versus alcohol treatment level and resultant BF viscosities is shown in FIG. 1.

Neither silane nor aliphatic alcohol reagent alone attains the lowest paste viscosity reached by certain treatment combinations of both on Clay A. For these silane/alcohol combinations, an optimal value for the silane component is reached at a surprisingly low treatment level of 0.10% to 0.40%. Silane treatment levels above this range are actually detrimental to paste viscosity performance. In contrast, considerably higher treatment levels of aliphatic alcohol are most beneficial for reducing viscosity, reaching an optimum in the 0.5% to 1.6% range when used in combination with silane. Combining aliphatic alcohol treatment with silane not only lowers the paste viscosity to levels unattainable using silane treatment alone, but is also beneficial for improving the dry bulk handling characteristics of the treated clay by reducing airborne dust formation during the transferring or conveying of the treated clay between storage bins or during bagging processes. Historically, treated clays produced from hydrophobic silane treatments have been particularly problematic with respect to their dusting characteristics. Dusting is an important safety concern since it is well recognized in the industry that dust inhalation is an occupational hazard, especially dust composed of submicron silicate particles. The significant de-dusting benefit provided by the use of an aliphatic alcohol in combination with the silane treatment was truly unexpected.

EXAMPLE 3

A second set of treated, coarse particle clays again prepared in accordance with Example 1 and having a free moisture content of about 1% by wt. were examined as fillers in an epoxy thermoset resin. Shell Chemical's Epon 862 was employed as the epoxy resin in this viscosity study. Paste viscosities were measured at a filler loading of 82 phr at 32° C. one hour after the treated clays were high speed dispersed into the epoxy resin using a Cowles dissolver unit. The BF viscosity measurements and data analysis were conducted as per Example 2. The purpose of this example is to demonstrate the utility of this invention for providing clay filled epoxy compounds of very low viscosity. Alcohol and silane treatment levels on Clay A versus their resulting BF viscosities are plotted in the viscosity response surface shown in FIG. 2.

The optimal treatment levels of IBTMO and n-decanol on Clay A, when used in combination with one another, are about 0.2% to 0.5% for the silane and about 0.2% to 1.4% for the alcohol. This silane treatment level range is very similar to that seen in the polyester resin study of Example 2, while the optimal alcohol treatment range needed in epoxies is offset some to slightly lower treatment levels. Nevertheless, a direct comparison of FIGS. 1 and 2 indicates that there is a large region of overlap in regards to silane/alcohol treatment combinations which provide very low viscosity in both resin systems. Clay C, as described in Example 1, is a treated product representative of this overlap region. Also, certain treatment combinations of silane and aliphatic alcohol give lower paste viscosities in this epoxy compound than are attainable by using either treatment agent alone at any treatment level.

EXAMPLE 4

Evaluation of Moisture Effects on Filled Resin Viscosities

Surface absorbed moisture on mineral fillers, such as clays, can drastically effect the paste viscosities of filled thermoset resins. Kaolin clays, being an aluminosilicate composition, are particularly susceptible to moisture pickup given their highly hydroxylated surfaces. The free moisture content on kaolin clays will thus vary depending on the relative humidity conditions to which they are exposed, with free moisture levels exceeding 1% by weight being possible when the relative humidity is high (i.e., for R.H. >about 80%). Also, water washed kaolin clays are in commercial practice typically produced and packaged while having a free moisture content of about 0.5%–0.8% by weight. Hence, the ability to make the paste viscosities of clay filled resins more insensitive to the filler's free moisture level would represent a very significant improvement in current thermoset technology. In this example, Clay A and Clay C (as previously described) with both low and high free moisture levels were respectively dispersed into Shell's epoxy resin Epon 828 at a filler loading of 82 phr for subsequent BF viscosity measurement. Clay free moisture levels of 0.3% and 0.8% by wt. were investigated for their comparative effects on BF viscosity. High shear dispersion of Clays A and C into the epoxy resin and all subsequent BF viscosity measurements were conducted as per Example 3. The BF viscosities obtained at the different clay moisture levels are tabulated in Table I. Clearly, the chemically treated clay of this invention (i.e., Clay C) yields filled epoxy compounds with surprisingly less moisture sensitivity than when using the corresponding untreated clay (Clay A).

TABLE I

Clay Moisture Effects on Paste Viscosity in Epon 828 Epoxy Resin

| Clay Filler @ 82 phr | Clay Moisture Level, Wt. % | BF Viscosity, cps/10³[1] |
|---|---|---|
| Untreated Clay (Clay A) | 0.3 | 47.6 |
| Untreated Clay (Clay A) | 0.8 | 89.0 |
| Treated Clay (Clay C) | 0.3 | 38.0 |
| Treated Clay (Clay C) | 0.8 | 35.6 |

Note: [1]Brookfield HBT, spindle #4, 32° C., 20 rpm, 1 hr. after mixing.

Figure 3:
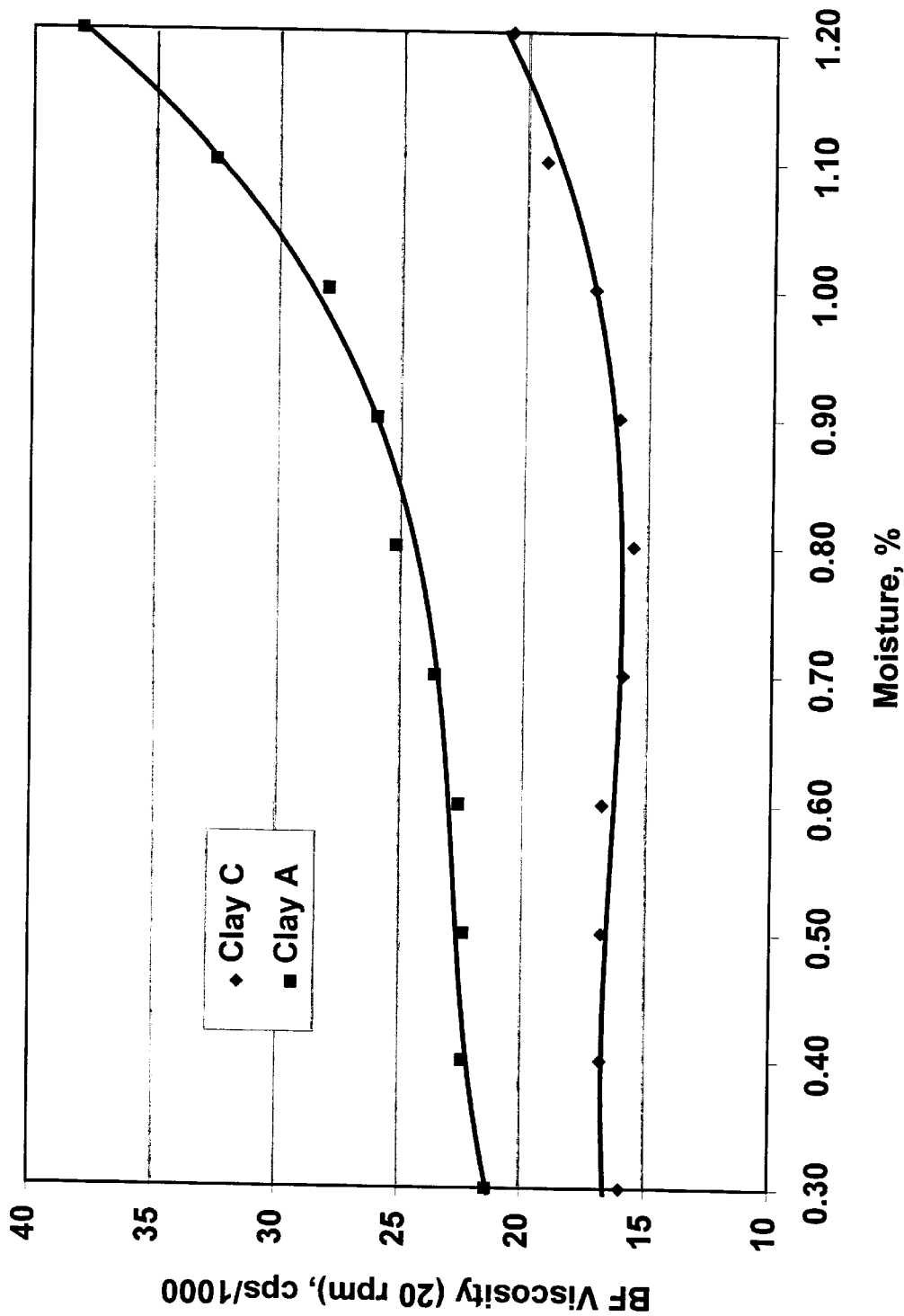
FIG. 3 is a comparative plot of Brookfield viscosity versus the clay's free moisture level for both untreated and treated clay products in a filled polyester resin (Aropol MR13017) employing a clay filler loading of 89 phr. The purpose of this plot is to show the relative effects of filler moisture level on resultant viscosity over free moisture levels from 0.20% to 1.20% by weight. The data demonstrate the reduced moisture sensitivity of the clay filled polyester composition to viscosity changes.

As further illustrated in FIG. 3, the analogous evaluation of Clay C in a general purpose polyester resin over a range of filler moisture levels indicates similar viscosity benefits relative to its untreated clay control (Clay A). Clay free moisture contents from 0.2% to 1.2% by weight were examined in this viscosity study, which employed Aropol MR13017 polyester resin at a clay filler loading of 89 phr. Clay filler dispersion and subsequent BF viscosity measurements were conducted as per Example 2. Examination of FIG. 3 indicates that resultant polyester compound viscosity is only modestly sensitive to differences in the filler's free moisture level at moisture contents below 0.7% by weight. However as the filler's moisture level exceeds 0.7% by weight, the difference in paste viscosity between untreated clay (Clay A) and Clay C increases dramatically. The inventive silane/alcohol treatment used in making Clay C once again decreases the moisture sensitivity of the thermoset compound such that paste viscosities in a polyester resin remain largely constant independent of filler moisture level.

EXAMPLE 5

In this example, Clay A was treated with emulsified combinations of IBTMO and n-decanol (in analogy with the method of Example 1) such that the total combined treatment level was maintained constant at 0.5% by weight. These treated clays were allowed to equilibrate to a filler moisture level of about 1% by wt. then evaluated for viscosity. The corresponding silane and alcohol treatment levels used on Clay A (Trials 1–3) and their resulting BF viscosities in Aropol MR13017 polyester resin at a clay filler loading of 89 phr are tabulated in Table II to demonstrate the cost advantages and performance advantages of using combined reagents for lowest paste viscosity versus silane treatment alone. In trials 2 and 3, a significant fraction of the expensive IBTMO silane was substituted with an equal amount by weight of inexpensive n-decanol. Commercially, trialkoxysilanes commonly cost on the order of $6.00 to $10.00 per lb. as compared to about $1.00 per lb. for aliphatic alcohols. This partial substitution of expensive silane with the inexpensive aliphatic alcohol does not deteriorate viscosity performance, but rather improves performance, thus affording both cost and performance advantages. This viscosity performance advantage is truly remarkable and unexpected in that a silane treatment agent (which has the ability to bond to the clay's surface) can be partially replaced with an aliphatic alcohol (a non-bonding organic additive) as an effective clay treatment.

TABLE II

Polyester Viscosities: Performance Advantages of Silane Substitution with Aliphatic Alcohol for Clay Treatment

| Trial | % TL of IBTMO | % TL of n-Decanol | BF Viscosity, cps/$10^{3(1)}$ |
| --- | --- | --- | --- |
| Control (Clay A) | 0.00 | 0.00 | 28.0 |
| 1 | 0.50 | 0.0 | 18.9 |
| 2 | 0.30 | 0.20 | 17.6 |
| 3 | 0.25 | 0.25 | 17.4 |

Note: [1]Brookfield HBT, spindle #4, 32° C., 20 rpm, 1 hr. after mixing.

EXAMPLE 6

In this example, Clay A was treated with emulsified combinations of IBTMO and n-decanol such that the total combined treatment level was maintained constant at 0.5% by weight. These treated clays were allowed to equilibrate to a filler moisture level of about 1% by wt. then evaluated for viscosity in an epoxy resin. The corresponding silane and alcohol treatment levels used on Clay A (Trials 1–4) and their resulting BF viscosities in Epon 862 epoxy resin at a clay filler loading of 82 phr are tabulated in Table III to demonstrate the cost advantages and performance advantages of using combined reagents for lowest paste viscosity versus silane treatment alone. In trials 2 and 3, a significant fraction of the expensive IBTMO silane was substituted with an equal amount by weight of inexpensive n-decanol. This partial substitution of expensive silane with the inexpensive aliphatic alcohol does not deteriorate viscosity performance, but rather improves performance, thus affording both cost and performance advantages. This viscosity performance advantage is truly remarkable and unexpected in that a silane treatment agent (which has the ability to bond to the clay's surface) can be partially replaced with an aliphatic alcohol (a non-bonding organic additive) as an effective clay treatment. Only until complete substitution of the silane with aliphatic alcohol was tried is the viscosity performance diminished.

TABLE III

Epoxy Viscosities: Performance Advantages of Silane Substitution with Aliphatic Alcohol for Clay Treatment

| Trial | % TL of IBTMO | % TL of n-Decanol | BF Viscosity, cps/$10^{3(1)}$ |
| --- | --- | --- | --- |
| Control (Clay A) | 0.00 | 0.0 | 43.4 |
| 1 | 0.50 | 0.0 | 27.6 |
| 2 | 0.30 | 0.20 | 19.2 |
| 3 | 0.14 | 0.36 | 16.4 |
| 4 | 0.00 | 0.50 | 35.6 |

Note: [1]Brookfield HBT, spindle #4, 32° C., 20 rpm, 1 hr. after mixing.

EXAMPLE 7

In this example, the IBTMO silane and n-decanol were added directly to the polyester resin (Aropol MR13017) along with the untreated clay (Clay A) during the Cowles high speed dispersion step rather than being used as a combined treatment pre-treated on the clay (e.g., as in Clay C). This alternative method is known to those skilled in the art as "in situ" addition. As in previous examples, the clay filler loading employed in this polyester study was 89 phr and the level and ratio of "in situ" addition of silane plus aliphatic alcohol (in wt. % based on total clay) was equivalent to that pre-treated on to the coarse particle clay when producing Clay C. In all cases, the clay moisture level was about 0.8% by weight. The test results in Table IV clearly indicate that the low viscosity benefits of this invention are fully realized only when the silane plus aliphatic alcohol are pre-treated on to the clay's surface. It is surmised that sufficient concentration of these chemical additives at the surface interface of clay to resin does not occur when using in situ addition, hence the significantly lower viscosity reduction benefit.

TABLE IV

Clay Pre-Treatment versus In Situ Addition of Silane and Alcohol in Polyester Resin MR13017

| Trial | Test Sample | BF Viscosity, cps/$10^{3(1)}$ |
| --- | --- | --- |
| Control | Clay A (untreated clay control) | 26.0 |
| 1 | Clay C (pre-treated clay)[2] | 14.6 |
| 2 | Clay A with in situ addition of silane and alcohol[2] | 23.5 |

Note:
[1]Brookfield HBT, spindle #4, 32° C., 20 rpm, 1 hr. after mixing.
[2]Additive levels for pre-treatment or in situ addition are: 0.25% IBTMO + 0.50% n-Decanol.

EXAMPLE 8

In this example a coarse particle, high aspect ratio, water washed delaminated clay (hereinafter referred to as Clay D) was used to partially replace some of Clay A as the filler in a polyester resin compound prepared from Aropol MR13017 resin. Clay D is a delaminated kaolin clay produced from a middle Georgia, cretaceous clay crude whose final physical properties include a Malvern median particle size of 6.5 microns and a BET surface area of 12 m$^2$/g. High aspect ratio delaminated clays, such as Clay D, are commercially produced by J. M. Huber Corporation of Macon, Georgia under the tradename Polyfil DLX and are well known in the art to improve the surface smoothness properties of composites and/or to provide increased flexural modulus. This example demonstrates that a significant portion of Clay A (about 20% by wt.) can be substituted with other types of high performance mineral fillers without increasing viscosity properties by utilizing the viscosity reduction benefits provided by the combined silane/alcohol treatment technology of this invention. Table V compares the BF viscosities of both untreated and treated versions of a Clay A+Clay D blend (@ 80/20 wt. ratio of A to D) versus the untreated Clay A in the MR13017 resin at a total clay loading of 89 phr. In regards to treatment, Clay A and Clay D were both treated with a 1:1 wt. ratio combination of silane/alcohol emulsion whereby 0.25% by wt. of IBTMO and 0.25% by wt. of n-decanol were applied to the clays. Both clays (in dry, finely milled form) were treated with a 50% active co-emulsion of these chemicals, oven dried and post-milled in analogy with the treatment procedure described in Example 1. Treatment of Clay A with 0.25% IBTMO+ 0.25% n-decanol yields the treated product Clay B, while the same treatment placed on Clay D yields the treated product Clay E. All clays were evaluated with a free moisture content of about 0.3% by wt. and their BF viscosities were measured in accordance with Example 2. In Table V, a comparison of the control experiment versus Trial 1 indicates a sharp increase in compound viscosity by a 20% replacement of Clay A with Clay D. This increase in BF viscosity is not too surprising given Clay D's significantly higher BET surface area. However, the viscosity obtained when using the 80/20 blend of pre-treated clays is greatly improved and is approximately the same as the original untreated Clay A. The use of the inventive treatment thereby enables one to achieve the added end-use performance benefits provided by the use of some delaminated clay while still maintaining a low viscosity essentially equivalent to that of untreated Clay A. Furthermore, this example serves to illustrate the utility of a different silane/alcohol treatment combination for clays versus that used in previous examples.

TABLE V

Partial Substitution of Coarse Particle Clay with Delaminated Clay in a Polyester Resin

| Trial | Test Sample | BF Viscosity, cps/10$^{3(1)}$ |
|---|---|---|
| Control | Clay A (untreated control) | 23.4 |
| 1 | Clay A/Clay D @ 80/20 Wt. Ratio (both clays untreated) | 36.0 |
| 2 | Clay B/Clay E @ 80/20 Wt. Ratio (blend using treated versions of A & D)$^{(2)}$ | 24.4 |

Note:
$^{(1)}$Brookfield HBT, spindle #4, 32° C., 20 rpm, 1 hr. after mixing.
$^{(2)}$Clay Treatment = 0.25% IBTMO + 0.25% n-Decanol

EXAMPLE 9

In this example, the paste viscosities of Clay C prepared by three different treatment methods are compared in Shell's Epon 862 epoxy resin. Clay A and a competitive coarse particle clay, ASP-400 from Engelhard Corporation, were also evaluated as comparative untreated controls. For this study, Clay C was prepared by the Henschel dry blending treatment method of Example 1 wherein the silane/alcohol chemicals were added as a co-emulsified blend of additives (trial 5 of Table VI) and alternatively as a "neat" blend of additives (trial 4). In preparing Clay C via the neat treatment method, the "neat" blend of silane/alcohol was added in more slowly and 10 additional minutes of Henschel blending time was employed to assist in obtaining more uniform surface coverage. In a third treatment experiment, Clay C was also prepared via using the same co-emulsified blend of silane/alcohol additives by an alternative slurry treatment plus spray-drying method (trial 3). This spray-dried version of Clay C was prepared by treating a stirred aqueous slurry of Clay A of about 50% clay solids with 0.75% by wt.(active basis) of the same 1:2 wt. ratio co-emulsion of IBTMO and n-decanol as previously made in Example 1. After mixing well for about 15 minutes, the treated clay slurry was then spray-dried and post-milled to yield a fine powder. All test clays were evaluated with a free moisture content of about 0.3% by wt. and their BF viscosities were measured at a filler loading of 82 phr in accordance with Example 3. The test results are summarized in Table VI and listed in descending order of viscosities. The ASP-400 clay was found to have the highest BF viscosity, followed by Clay A. Although all the treated clays had a lower BF viscosity than the untreated clays, the Clay C samples that had been treated by the dry blending method (trials 4 and 5) both had a significantly lower viscosity than Clay C which had been spray-dried (trial 3). These data clearly illustrate that the maximum viscosity benefit provided by the inventive treatment is dependent on the method of treatment. Although the use of a silane/alcohol co-emulsion via dry blending with clay is preferred, this experiment demonstrates that essentially equivalent benefits can be obtained via the addition of a neat additive blend so long as additional care is taken to blend for a longer time period to insure good uniform coverage of the clay particles. The data of Table VI also show the viscosity advantage of the treated clays of this invention relative to the current industry standard, ASP-400.

TABLE VI

Comparative BF Viscosities of Treated Clays Prepared by Different Treatment Methods

| Trial | Clay Test Sample | BF Viscosity in Epon 862, cps/10$^{3(1)}$ |
|---|---|---|
| 1 | ASP-400 | 51.2 |
| 2 | Clay A (untreated control) | 37.8 |
| 3 | Clay C-spray dry method | 24.4 |
| 4 | Clay C-dry blend/neat method | 19.6 |
| 5 | Clay C-dry blend/emulsion method | 19.0 |

Note: $^{(1)}$Brookfield HBT, spindle #4, 32° C., 20 rpm, 1 hr. after mixing.

EXAMPLE 10

In this example, the unique ability of the inventive treatment to reduce the moisture sensitivity of clay filled thermoset compounds with respect to viscosity build relative to the use of other treated clays is demonstrated. Clay A was treated with 0.5% of n-decanol and another batch of Clay A was treated with 0.5% of IBTMO silane. Both treated clays (trials 2 and 3 of Table VII) were prepared via the use of emulsified reagents and by treating the dry clay with a given emulsion via intimate blending in a Henschel blender followed by drying and post-milling. These treated clays were then evaluated for viscosity against Clay C in Aropol MR13017 polyester resin at a clay filler loading of 89 phr. All clays were evaluated at free moisture contents of 0.3% and 0.8% by wt., respectively, to determine the relative effects of free moisture on viscosity. BF viscosities were measured in accordance with Example 2. The viscosity data are summarized in Table VII, which show that neither aliphatic alcohol nor silane treatment alone on Clay A has the mitigating effect on viscosity at high free moisture levels as compared to the combined silane/alcohol treatment used in making Clay C. This suggests another synergistic benefit derived from combining aliphatic alcohols and silanes as treatments for clay.

TABLE VII

Evaluation of Treated Clays of Different Free Moisture Content in Polyester Resin MR13017

| Trial | Test Sample | BF Viscosity w/0.3% Free Moisture on Clay, cps/10$^{3(1)}$ | BF Viscosity w/0.8% Free Moisture on Clay, cps/10$^{3(1)}$ |
|---|---|---|---|
| 1 | Clay C | 15.8 | 16.0 |
| 2 | Clay A + 0.5% n-decanol treatment | 15.6 | 21.8 |
| 3 | Clay A + 0.5% IBTMO treatment | 17.2 | 33.2 |

Note: $^{(1)}$Brookfield HBT, spindle #4, 32° C., 20 rpm, 1 hr. after mixing.

EXAMPLE 11

In this example, the utility of the inventive silane/alcohol treatment for treating other hydroxylated inorganic fillers, such as alumina trihydrate (ATH), targeted for use in thermoset resins is demonstrated. The ATH filler employed in this study was J. M. Huber Corporation's SB-432, which is a Bayer type ATH that has been processed through a Raymond roller mill to yield a dry ground product having an average Stokes equivalent particle diameter of about 9.0 microns and a BET surface area of about 2.0 m$^2$/g. The SB-432 was treated with 0.25% by wt. of IBTMO and 0.50% by wt. of n-decanol that were added "neat" to the ATH as a pre-blended chemical combination of 1:2 wt. ratio. Neat treatment of the ATH with this silane/alcohol combination was accomplished through the use of a Henschel blender, whereafter the treated product was lightly pulverized to affect deagglomeration. The treated and untreated versions of SB-432 were then evaluated for paste viscosity in Shell's Epon 862 epoxy resin at a filler loading of 113 phr. The ATH samples were tested at free moisture contents of 0.2% and 0.5% by wt., respectively, and their BF viscosities were measured in accordance with Example 3. The viscosity data are summarized in Table VIII, which clearly show the viscosity advantages provided by the inventive treatment on ATH at the higher free moisture level of 0.5%.

TABLE VIII

Comparative Evaluation of a Treated and Untreated ATH in Epon 862 Epoxy Resin

| Trial | ATH Test Sample | BF Viscosity w/0.2% Free Moisture on ATH, cps/10$^{3(1)}$ | BF Viscosity w/0.5% Free Moisture on ATH, cps/10$^{3(1)}$ |
|---|---|---|---|
| 1 | SB-432 (untreated control) | 24.8 | 28.8 |
| 2 | SB-432 + 0.75% of 1:2 silane/alcohol treatment | 24.0 | 23.6 |

Note: $^{(1)}$Brookfield HBT, spindle #4, 32° C., 20 rpm, 1 hr. after mixing.

EXAMPLE 12

In this example, the paste viscosities of several modified clays prepared from Clay A by treating with different silane/alcohol treatments are compared in Aropol MR13017 polyester resin at a clay filler loading of 89 phr. Table IX (trials 3–8) detail the various silane/alcohol combinations employed as treatments for Clay A whereby the vinylsilane used was vinyltriethoxysilane, the phenylsilane used was phenyltrimethoxysilane, the octylsilane used was n-octyltriethoxysilane, the methylsilane used was methyltrimethoxysilane and the C$_{10}$–C$_{12}$ alcohol used was a blend of aliphatic alcohols comprising C$_{10}$ and C$_{12}$ alcohol components. All silane/alcohol treatments were applied at a 1:2 wt. ratio, while maintaining a total treatment level of 0.75% by weight. These treated clay products were prepared by treating dry Clay A with the appropriate silane/alcohol co-emulsion in a Henschel blender, followed by drying and post-milling, in a manner analogous to the treatment procedure of Example 1. All test clays were evaluated at a free moisture content of about 0.8% by wt. and their BF viscosities measured in accordance with Example 2. The BF viscosity data are summarized in Table IX, which clearly show that other silane/alcohol treatment systems are equally useful as Clay C in reducing the viscosity of clay filled polyester compounds. All the silane/alcohol treatment systems, with the exception of the IBTMO/n-octanol treatment of trial 6, yielded lower viscosities than untreated Clay A. In particular, the treatments comprised of IBTMO/C$_{10}$–C$_{12}$ alcohol and of methylsilane/n-decanol provided excellent results on Clay A. Further testing of these two treatments at a low filler moisture level (i.e., about 0.3% by wt.), yielded paste viscosities of 14,300 cps and 14,700 cps, respectively. These BF viscosity values are essentially equivalent to those reported for trials 7 and 8 of Table IX, thereby indicating that these silane/alcohol treatments also have a mitigating influence on viscosity as the filler's free moisture level vanes.

TABLE IX

Comparative BF Viscosities of Treated Clays Prepared from Different Silane/Alcohol Treatments

| Trial | Clay Test Sample$^{(2)}$ | BF Viscosity in MR13017, cps/10$^{3(1)}$ |
|---|---|---|
| 1 | Clay A | 26.0 |
| 2 | Clay C | 16.0 |
| 3 | Clay C + 0.75% of 1:2 vinylsilane/n-decanol treatment | 22.8 |
| 4 | Clay C + 0.75% of 1:2 phenylsilane/n-decanol treatment | 22.0 |
| 5 | Clay C + 0.75% of 1:2 octylsilane/n-decanol treatment | 18.0 |
| 6 | Clay C + 0.75% of 1:2 IBTMO/n-octanol treatment | 28.2 |
| 7 | Clay C + 0.75% of 1:2 IBTMO/C$_{10}$–C$_{12}$ alcohols treatment | 14.4 |
| 8 | Clay C + 0.75% of 1:2 methylsilane/n-decanol treatment | 14.8 |

Note: $^{(1)}$Brookfield HBT, spindle #4, 32° C., 20 rpm, 1 hr. after mixing.
$^{(2)}$All test clays had a free moisture content of about 0.8% by wt..

EXAMPLE 13

Figure 4:
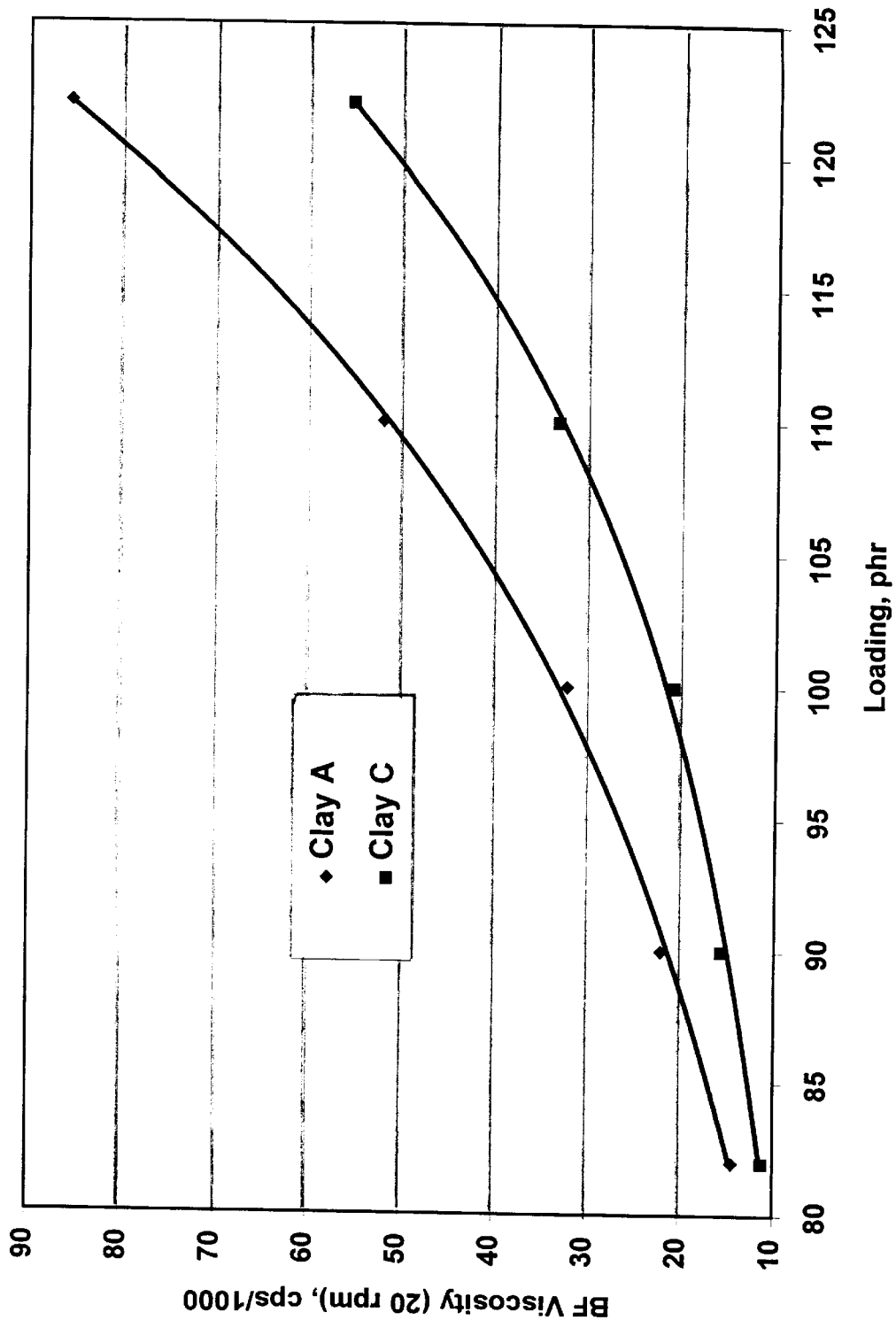
FIG. 4 is a comparative plot of Brookfield viscosity versus clay filler loading for both untreated and treated clay products in a filled polyester resin (Ashland Chemical's Aropol Q6586) employing test clays having a free moisture level of about 0.8% by weight. Clay filler loadings from 82 phr to 122 phr are shown. This plot shows that the viscosity benefits provided by the inventive silane/alcohol treatment increase as the clay filler loading is increased; hence, higher filler loadings can be used with the treated clay product as compared to the untreated clay control while maintaining a set viscosity value.
Figure 5:
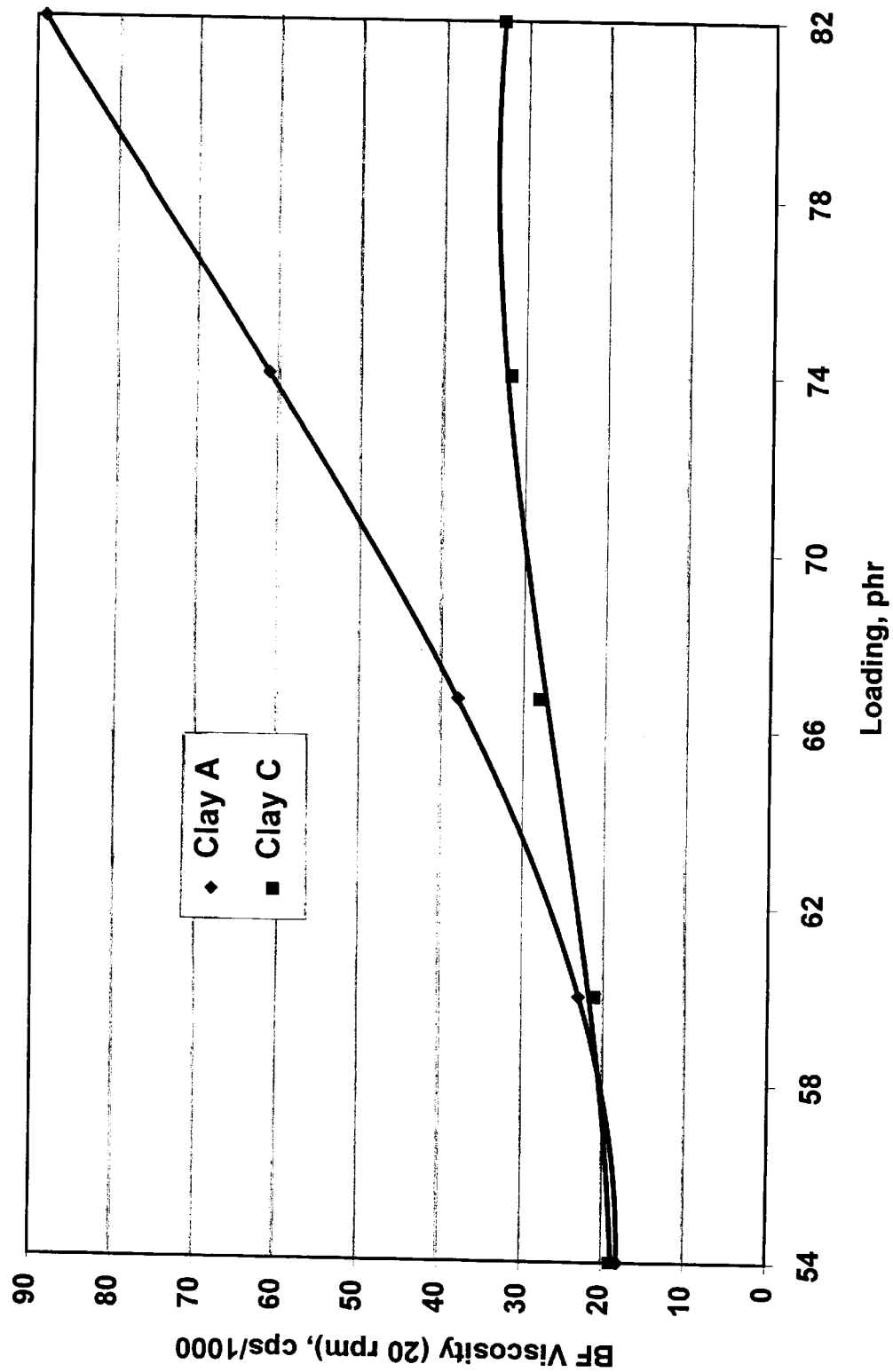
FIG. 5 is a comparative plot of Brookfield viscosity versus clay filler loading for both untreated and treated clay products in a filled epoxy resin (Shell Chemical's Epon 828) employing test clays having a free moisture level of about 0.8% by weight. Clay filler loadings from 54 phr to 82 phr are shown in FIG. 5. This plot also shows that the viscosity benefits provided by the inventive silane/alcohol treatment increase as the clay filler loading is increased.

In this example, the paste viscosity performance of Clay A and Clay C are compared in the polyester resin Aropol Q6586 (from Ashland Chemical) and also in the epoxy resin Epon 828 (from Shell Chemical) as a function of clay filler loading. Both clays were evaluated in these resins at a free moisture content of about 0.8% by weight, while the filler loadings were varied from 82 phr to 122 phr in the polyester compound and from 54 phr to 82 phr in the epoxy compound. The BF viscosities for each system were measured in accordance with Examples 2 and 3, respectively, and the test results are plotted in FIGS. 4 and 5. Examination of FIGS. 4 and 5 indicates that the inventive treatment, when used on a coarse particle kaolin clay, yields greater viscosity reduction benefits in thermosets as the clay filler loading is increased. These data also suggest that the inventive treatment will allow higher loadings of coarse clay to be used in thermoset compounds (e.g., loadings >100 phr) while maintaining equal viscosity and processability properties. For example, FIG. 4 shows that Clay C used at a filler loading of about 120 phr has the same paste viscosity as Clay A at about 110 phr, while FIG. 5 shows that Clay C used at 82 phr has the same paste viscosity as Clay A at about 65 phr. These differences represent significant increases in filler loading capability.

Although only a few exemplary embodiments of this invention have been described in detail above, those skilled in the art will readily appreciate that many modifications are possible in the exemplary embodiments without materially departing from the novel teachings and advantages of this invention.

What is claimed is:

1. A modified particulate mineral product, comprising:
    a particulate mineral selected from the group consisting of a clay having a Stokes equivalent particle diameter greater than about 3 microns and alumina trihydrate having a BET surface area of less than about 5 m$^2$ per gram;

a silane, said silane being a silicon compound of the formula:

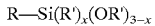

wherein
R=$C_1$–$C_{10}$ alkyl, alicyclic alkyl, aryl, vinyl, or methacryl,
R'=methyl or ethyl, and
x=0 or 1; and
a long chain aliphatic alcohol.

2. The modified particulate mineral product according to claim 1, wherein said alcohol is a $C_6$–$C_{18}$ aliphatic alcohol.

3. The modified particulate mineral product according to claim 2, wherein the particulate mineral comprises a coarse kaolin clay.

4. The modified particulate mineral product according to claim 3, wherein the coarse kaolin clay has a Stokes equivalent particle diameter of about 4.5–6.0 microns and a BET surface area in the range of about 8–11 $m^2$ per gram.

5. The modified particulate mineral product according to claim 2, wherein the silane content of said product is in the range of about 0.01 to 1.0 weight percent on a dry mineral basis, and wherein the alcohol content of said product is in the range of about 0.01 to 3.0 weight percent on a dry mineral basis.

6. The modified particulate mineral product according to claim 5, wherein the relative weight ratio of silane to alcohol is in the range of about 5:1 to 1:15 on an active weight basis.

7. The modified particulate mineral product according to claim 5, wherein the silane content of said product is in the range of about 0.1 to about 0.5 weight percent on a dry mineral basis, and wherein the alcohol content of said product is in the range of about 0.1 to about 1.6 weight percent on a dry mineral basis.

8. The modified particulate mineral product according to claim 7, wherein the relative weight ratio of silane to alcohol is in the range of about 2:1 to 1:7 on an active weight basis.

9. The modified particulate mineral product according to claim 1, wherein said product is in dry form.

10. The modified particulate mineral product according to claim 9, further comprising a surfactant.

11. The modified particulate mineral product according to claim 10, wherein the surfactant content is in the range of from about 8 ppm to 1600 ppm based on the weight of dry mineral.

12. The modified particulate mineral product according to claim 10, wherein the surfactant is a nonionic surfactant having a HLB value ranging from about 12 to 18.

13. The modified particulate mineral product according to claim 2, wherein the silane is selected from the group consisting of isobutyltrimethoxysilane, vinyltriethoxysilane, n-octyltriethoxysilane, methyltrimethoxysilane, and n-propyltrimethoxysilane.

14. The treated modified particulate mineral product according to claim 2, wherein the $C_6$–$C_{18}$ aliphatic alcohol is selected from the group consisting of n-octanol, n-decanol, and a blend of n-decanol with n-dodecanol.

15. The modified particulate mineral product according to claim 7, wherein the particulate mineral comprises a coarse kaolin clay.

16. The modified particulate mineral product according to claim 15, wherein the coarse kaolin clay has a Stokes equivalent particle diameter of about 4.5–6.0 microns and a BET surface area in the range of about 8–11 $m^2$ per gram.

17. The modified particulate mineral product according to claim 13, wherein the particulate mineral comprises a coarse kaolin clay having a Stokes equivalent particle diameter of about 4.5–6.0 microns and a BET surface area in the range of about 8–11 $m^2$ per gram.

18. The modified particulate mineral product according to claim 14, wherein the particulate mineral comprises a coarse kaolin clay having a Stokes equivalent particle diameter of about 4.5–6.0 microns and a BET surface area in the range of about 8–11 $m^2$ per gram.

19. The modified particulate mineral product according to claim 16, wherein said product comprises about 0.25 weight percent on a dry clay basis of isobutyltrimethoxysilane and about 0.50 weight percent on a dry clay basis of n-decanol.

20. The modified particulate mineral product according to claim 5, wherein the particulate mineral comprises an alumina trihydrate having a BET surface area of less than about 5 $m^2$ per gram.

21. The modified particulate mineral product according to claim 2, wherein said clay comprises a coarse kaolin clay having a Stokes equivalent particle diameter of greater than about 3 microns and a delaminated kaolin clay.

22. A method of surface treating a particulate mineral, comprising the step of blending a particulate mineral with a silane and a long chain aliphatic alcohol for a period of time sufficient to produce an effective surface treatment, said particulate mineral being selected from the group consisting of a clay having a Stokes equivalent particle diameter of greater than 3 microns and an alumina trihydrate having a BET surface area of less than about 5 $m^2$ per gram, said silane being a silicon compound of the formula:

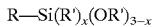

wherein
R=$C_1$–$C_{10}$ alkyl, alicyclic alkyl, aryl, vinyl, or methacryl,
R'=methyl or ethyl, and
x=0 or 1.

23. The method of surface treating a particulate mineral according to claim 22, further comprising the step of heat drying said particulate mineral after said blending step.

24. The method of surface treating a particulate mineral according to claim 22, further comprising the step of milling said particulate mineral after said blending step.

25. The method of surface treating a particulate mineral according to claim 23, further comprising the step of milling said particulate mineral after said heat drying step.

26. The method of surface treating a particulate mineral according to claim 22, wherein said alcohol is a $C_6$–$C_{18}$ aliphatic alcohol.

27. The method of surface treating a particulate mineral according to claim 26, wherein said clay is a coarse kaolin clay.

28. The method of surface treating a particulate mineral according to claim 27, wherein said coarse kaolin clay has a Stokes equivalent particle diameter of about 4.5–6.0 microns and a BET surface area in the range of about 8 11 $m^2$ per gram.

29. A modified particulate mineral product produced by the process according to claim 26, wherein the product comprises:
said silane in the amount of about 0.01 to 1.0 weight percent on a dry mineral basis;
said alcohol in the amount of about 0.01 to 3.0 weight percent on a dry mineral basis;
and
a relative weight ratio of silane to alcohol in the range of about 5:1 to 1:15 on an active weight basis.

30. The modified particulate mineral product according to claim 25, wherein the silane amount is about 0.1 to about 0.5 weight percent on a dry mineral basis, the alcohol amount is about 0.1 to about 1.6 weight percent on a dry mineral basis, and the relative weight ratio of silane to alcohol present is in the range of about 2:1 to 1:7 on an active weight basis.

31. A modified particulate mineral product produced by the process according to claim 28, wherein said silane is isobutyltrimethoxysilane in an amount of about 0.25 weight percent on a dry clay basis, and said alcohol is n-decanol in an amount of about 0.50 weight percent on a dry clay basis.

32. The method of surface treating a particulate mineral according to claim 22, wherein the particulate mineral is in a finely divided dry form prior to said blending step.

33. The method of surface treating a particulate mineral according to claim 32, further comprising the step of combining said silane and said alcohol before said blending step.

34. The method of surface treating a particulate mineral according to claim 25, further comprising the steps of emulsifying said silane in water with a surfactant before said blending step, and emulsifying said alcohol in water with a surfactant before said blending step.

35. The method of surface treating a particulate mineral according to claim 25, further comprising the steps of combining said silane and said alcohol to form a pre-blend, then emulsifying said pre-blend in water with a surfactant before said blending step.

36. The method of surface treating a particulate mineral according to claim 34, wherein the surfactant is a nonionic surfactant having a HLB value ranging from about 12 to about 18.

37. The method of surface treating a particulate mineral according to claim 36, wherein the total amount of nonionic surfactant employed is about 4 parts by weight per 100 parts combined weight of said silane and said alcohol.

38. The method of surface treating a particulate mineral according to claim 34, wherein said alcohol is a $C_6$–$C_{18}$ aliphatic alcohol.

39. The method of surface treating a particulate mineral according to claim 38, wherein said clay is a coarse kaolin clay.

40. The method of surface treating a particulate mineral according to claim 39, wherein said coarse kaolin clay has a Stokes equivalent particle diameter of about 4.5–6.0 microns and a BET surface area in the range of about 8–11 $m^2$ per gram.

41. A modified particulate mineral product produced by the process according to claim 38, wherein the product comprises:
    said silane in the amount of about 0.01 to 1.0 weight percent on a dry mineral basis;
    said alcohol in the amount of about 0.01 to 3.0 weight percent on a dry mineral basis;
    and
    a relative weight ratio of silane to alcohol in the range of about 5:1 to 1:15 on an active weight basis.

42. The modified particulate mineral product according to claim 41, wherein the silane amount is about 0.1 to about 0.5 weight percent on a dry mineral basis, the alcohol amount is about 0.1 to about 1.6 weight percent on a dry mineral basis, and the relative weight ratio of silane to alcohol present is in the range of about 2:1 to 1:7 on an active weight basis.

43. The modified particulate mineral product produced according to the process of claim 40, wherein the product comprises about 0.25 weight percent on a dry clay basis of isobutyltrimethoxysilane and about 0.50 weight percent on a dry clay basis of n-decanol.

44. The method of surface treating a particulate mineral according to claim 35, wherein the particulate mineral is an aqueous slurry prior to said blending step.

45. The modified particulate mineral product according to claim 22, wherein said clay is a coarse kaolin clay.

46. The modified particulate mineral product according to claim 45, wherein said coarse kaolin clay has a Stokes equivalent particle diameter of about 4.5–6.0 microns and a BET surface area in the range of about 8–11 $m^2$ per gram.

47. The modified particulate mineral product according to claim 46, wherein said clay is a coarse kaolin clay.

48. The modified particulate mineral product according to claim 47, wherein said coarse kaolin clay has a Stokes equivalent particle diameter of about 4.5–6.0 microns and a BET surface area in the range of about 8–11 $m^2$ per gram.

49. A thermoset composition, comprising a thermoset resin and a modified particulate mineral product according to claim 42, wherein said thermoset resin is selected from the group consisting of epoxy, unsaturated polyester and acrylic resins.

50. The thermoset composition according to claim 49, wherein the modified particulate mineral product is present at a loading level of from about 10 to about 220 parts by weight per hundred resin.

51. The thermoset composition according to claim 50, wherein the modified particulate mineral product is present at a loading level of from about 50 to about 175 parts by weight per hundred resin.

52. A thermoset composition, comprising: a thermoset resin and a modified particulate mineral product according to claim 41, wherein said thermoset resin is selected from the group consisting of epoxy, unsaturated polyester and acrylic resins.

53. The thermoset composition according to claim 52, wherein the modified particulate mineral product is present at a loading level of from about 10 to about 220 parts by weight per hundred resin.

54. The thermoset composition according to claim 53, wherein the modified particulate mineral product is present at a loading level of from about 50 to about 175 parts by weight per hundred resin.

55. A thermoset composition, comprising:
    a thermoset resin;
    a modified particulate mineral product in accordance with claim 22; and
    at least one unmodified inorganic filler, wherein said modified particulate mineral product and said at least one unmodified inorganic filler have a combined content of about 10 to about 220 parts by weight per hundred resin.

56. The thermoset composition of claim 55, wherein the at least one unmodified inorganic filler comprises at least one material selected from the group consisting of alumina trihydrate, talc, calcium carbonate, mica, glass, calcined clay, delaminated kaolin clay, silica, and wollastonite.

57. A thermoset composition, comprising:
    a thermoset resin;
    a modified particulate mineral product in accordance with claim 45; and
    at least one unmodified inorganic filler, wherein said modified particulate mineral product and said at least one unmodified inorganic filler have a combined content of about 10 to about 220 parts by weight per hundred resin.

58. The thermoset composition of claim 57, wherein said at least one unmodified inorganic filler comprises at least one material selected from the group consisting of alumina trihydrate, talc, calcium carbonate, mica, glass, calcined clay, delaminated kaolin clay, silica, and wollastonite.

* * * * *